US006769186B1

(12) United States Patent
Sakhleh et al.

(10) Patent No.: US 6,769,186 B1
(45) Date of Patent: Aug. 3, 2004

(54) VARIABLE-SPEED CORING TOOL KIT

(76) Inventors: Zuhoor R. Sakhleh, 9001 Littleton Ct., Orlando, FL (US) 32817; Irene Sakhleh, 9001 Littleton Ct., Orlando, FL (US) 32817

( * ) Notice: Subject to any disclaimer, the term of this patent is extended or adjusted under 35 U.S.C. 154(b) by 0 days.

(21) Appl. No.: 10/352,120

(22) Filed: Jan. 28, 2003

(51) Int. Cl.⁷ .............................................. A47J 25/00
(52) U.S. Cl. ..................... 30/298.4; 30/113.1; 248/37.3
(58) Field of Search .............................. 30/113.1, 113.3, 30/123, 272.1, 273, 275.4, 277.4, 296.1, 298.4, DIG. 1, 276; 248/37.3; D7/693, 694

(56) References Cited

U.S. PATENT DOCUMENTS

| | | | |
|---|---|---|---|
| 2,079,496 A | * | 5/1937 | Domack ..................... 30/113.3 |
| 2,540,393 A | * | 2/1951 | Hawley ..................... 30/113.3 |
| 3,164,183 A | | 1/1965 | Kirkpatrick ................. 30/113.1 |
| D204,479 S | * | 4/1966 | Cassidy ........................ D7/637 |
| 3,348,116 A | * | 10/1967 | Freeman et al. ............. 320/115 |
| 3,780,435 A | * | 12/1973 | Farha et al. ................ 30/113.1 |
| 5,852,875 A | | 12/1998 | Dolah ........................ 30/113.1 |
| 6,662,453 B1 | * | 12/2003 | Stuckey et al. ............. 30/298.4 |

* cited by examiner

Primary Examiner—Hwei-Siu Payer
(74) Attorney, Agent, or Firm—Richard C. Litman

(57) ABSTRACT

A variable-speed coring tool kit for coring vegetables and fruits is provided which includes a decorative stand for charging and removably storing a decorative handle of a coring tool until needed for use. The tool handle and stand together form a decorative display. The tool handle is hollow and has an exterior surface constructed to resemble an oblong vegetable. The handle houses an implement locking mechanism, a three-speed D.C. motor and a rechargeable battery for powering the motor. The stand includes a compartment for receiving a battery charger and a retractable reel of electric cord. Cavities are formed in the stand for receiving the coring tool handle and various coring implements to be used with the coring tool.

20 Claims, 5 Drawing Sheets

VARIABLE-SPEED CORING TOOL KIT

BACKGROUND OF THE INVENTION

1. Field of the Invention

The present invention relates to battery-powered coring tools, and more specifically to a coring tool kit having a rechargeable battery-powered variable-speed coring tool and a recharging stand with a compartment for storing and recharging the coring tool and a compartment for storing additional coring utensils for various coring tasks.

2. Description of the Related Art

The use of hand-held battery-powered coring tools is well known in the prior art. They are generally known for making the task of coring vegetables and fruit easier and less time consuming than using hand-held implements to manually carve out the cores of vegetables and fruits.

Coring tools of the prior art can be manually manipulated or powered by electricity. U.S. Pat. No. 3,164,183, issued Jan. 5, 1965 to J. S. Kirkpatrick, shows an electric paring and coring device. A socket is provided on the top of a casing for removably supporting the device for easy access. The casing houses a transformer and a reel of electrical cord to supply power to the device and allowing the device to be readily moved from the casing when it is desired to be used. The device of Kirkpatrick can be run on D.C. or A.C. voltage. For the D.C. version, Kirkpatrick teaches a battery-powered unit with a stand for recharging the batteries.

U.S. Pat. No. 5,852,875, issued Dec. 29, 1998 to Dolah, also teaches the added convenience of making coring devices battery powered. Dolah further teaches making the coring implement detachable from the device so that different coring implements and brush attachments can be used on the device for coring vegetables and fruits with different textures, or for cleaning out items such as baby bottles, toilets, etc. A rechargeable battery is housed within the handle of the device with the motor to rotate the coring implements and attachments.

In addition, Dolah, teaches using coring implements of various sizes and shapes for fruits and vegetables having different sizes and degrees of softness. Dolah also teaches the use of one motor speed for all the coring and cleaning tasks.

None of the above inventions and patents, taken either singly or in combination, is seen to describe the instant invention as claimed. Thus a variable-speed coring tool kit solving the aforementioned problems is desired.

SUMMARY OF THE INVENTION

The present invention provides a decorative tool kit for coring vegetables and fruits. The kit includes a coring tool with a decorative handle for grasping when coring vegetables, a plurality of variously sized and shaped coring implements separately attachable to the coring tool, and a decorative stand for charging and removably storing the decorative coring tool until needed for use. The decorative stand also includes a compartment for inconspicuously storing the plurality of coring implements. The tool and stand together form a decorative display. Preferably, the display is in the form of a basket of vegetables, but may be any sort of ornate decoration suitable for a room where the coring tool is put to use, such as a flower or fruit basket for the kitchen of a home.

The ornate handle of the tool is hollow. Preferably, the hollow handle has an exterior surface constructed to resemble an oblong vegetable, piece of fruit or other object. The stand is preferably in the form of a decorative basket of vegetables, fruit or other objects so that the handle and stand are complementary and make the coring tool kit inconspicuously appear as an decorative display for the kitchen or other room of a home. The tool handle and stand are preferably formed from a durable synthetic resin material but may be formed of any suitable material.

The stand also includes an inner compartment operatively receiving a retractable electric cord. The inner compartment also operatively receives a battery charger for charging the battery power supply of the tool. The cord is wound on a retractable reel for convenient storage within the display.

The battery charger unit has a charging prong protruding outwardly from the base of a first open cavity provided in the stand for recharging of the power source (rechargeable battery) within the tool handle. The stand also includes a second covered cavity for receiving and storing an assortment of coring utensils or other attachments used with the coring tool. The coring utensils and/or other variously sized and shaped attachments are securable at their attachment ends into an extension of the shaft of a three speed D.C. motor received within the interior cavity of the handle. Each utensil is formed with a blade having a beveled edge for cutting away the flesh of the vegetable it is designed for use on. An annular protrusion encircles the stem in an area adjacent to the second end of the stem for cooperating with an arm of a locking mechanism fixedly mounted within the handle to removably secure the utensil in the handle for rotation with the motor shaft.

Additional coring utensils may be provided which differ in size. Utensils may also be provided which are scoop-like in construction, i.e. in the form of a spoon or bowl for making fruit balls.

Switch position indicia and the sliding switch handle are provided on the outer surface of the tool handle. Pushbutton or other type switches are also suitable for use on the bottom of the tool handle for controlling the motor. The switch may also be placed so as to be accessible through the outer wall of the handle.

Accordingly, it is a principal object of the invention to provide a portable coring tool with utensils for coring different vegetables.

It is a further object of the invention to provide a coring tool with a variable speed motor for rotating the coring utensils at speeds appropriate for the different stages of the coring process of certain vegetables.

Still another object of the invention is to provide a portable battery-powered coring tool that rotates at a slower speed when more control is required during coring, such as when the coring task is nearly finished and only small amounts remain to be cored out.

It is a further object of the invention to provide a portable battery-powered coring tool that rotates at a faster speed when more power required, such as when the coring process is started.

It is additional an object of the invention to provide a handy rechargeable portable coring tool and a charging stand for storing the handle and recharging the handle battery when necessary.

It is a still further object of the invention to provide a portable coring which, when stored within the charging stand, inconspicuously appears as a part of a decorative display for any room in a home where the tool is put to use.

It is an object of the invention to provide improved elements and arrangements thereof for the purposes described which is inexpensive, dependable and fully effective in accomplishing its intended purposes.

These and other objects of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

Figure 1:
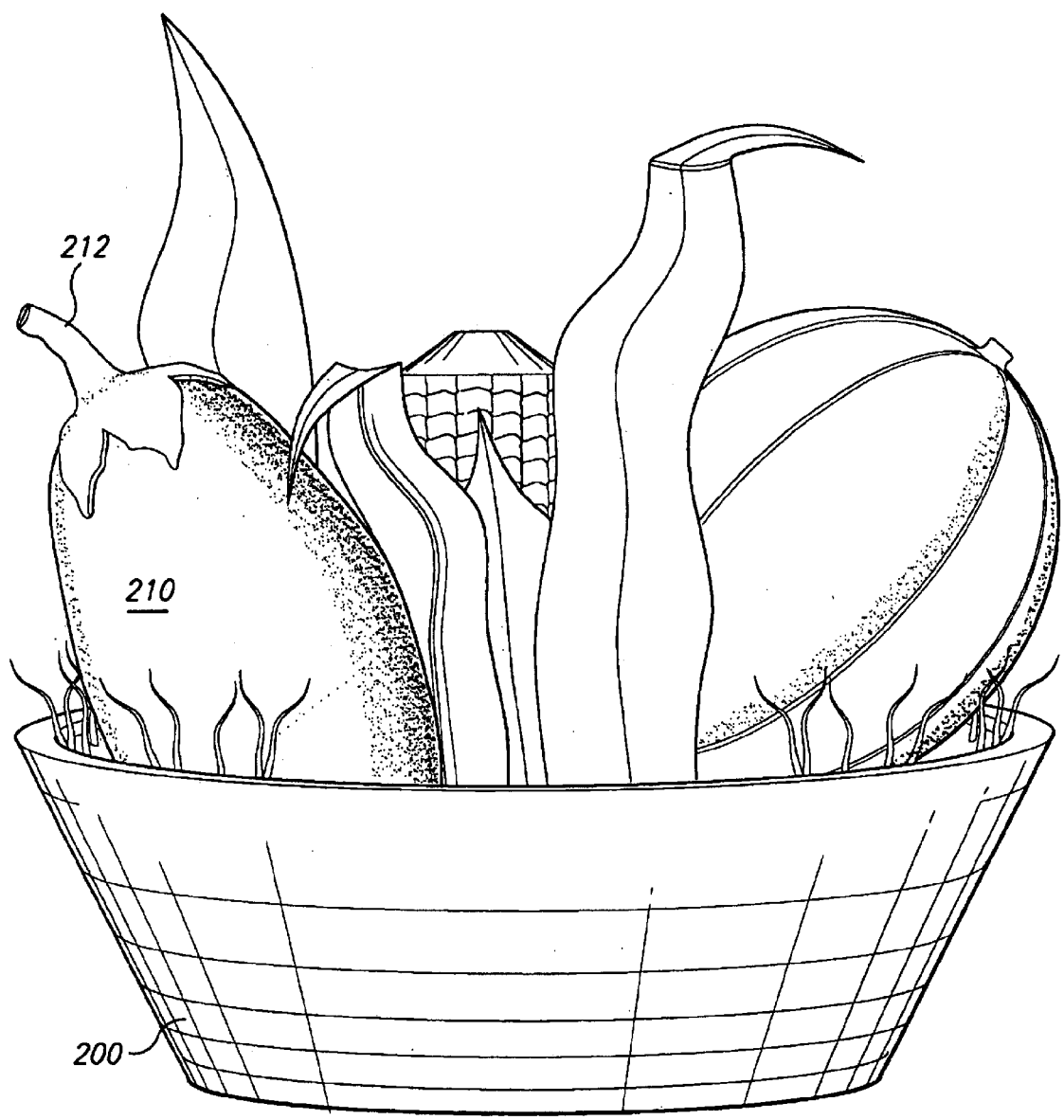
FIG. 1 is an environmental, perspective view of a variable-speed coring tool kit according to the present invention.

The present invention relates to a decorative tool kit for coring vegetables and fruits. The kit includes a coring tool with a decorative handle and a decorative stand for charging and removably storing a decorative coring tool until needed for use. The tool and stand together form a unique decorative display, as best seen in FIG. 1, which shows the display in the form of a basket of vegetables.

The tool 100 comprises a hollow tool handle, preferably having an outer wall with an exterior surface constructed to resemble an oblong vegetable, such as an ear of corn. The stand 200 is preferably in the form of a decorative basket of vegetables so that the tool handle 100 and stand 200 are complementary and make the tool inconspicuously appear as an decorative display for the kitchen or other room of a home. The tool handle 100 and stand 200 are preferably formed from a durable synthetic resin material.

Figure 2:
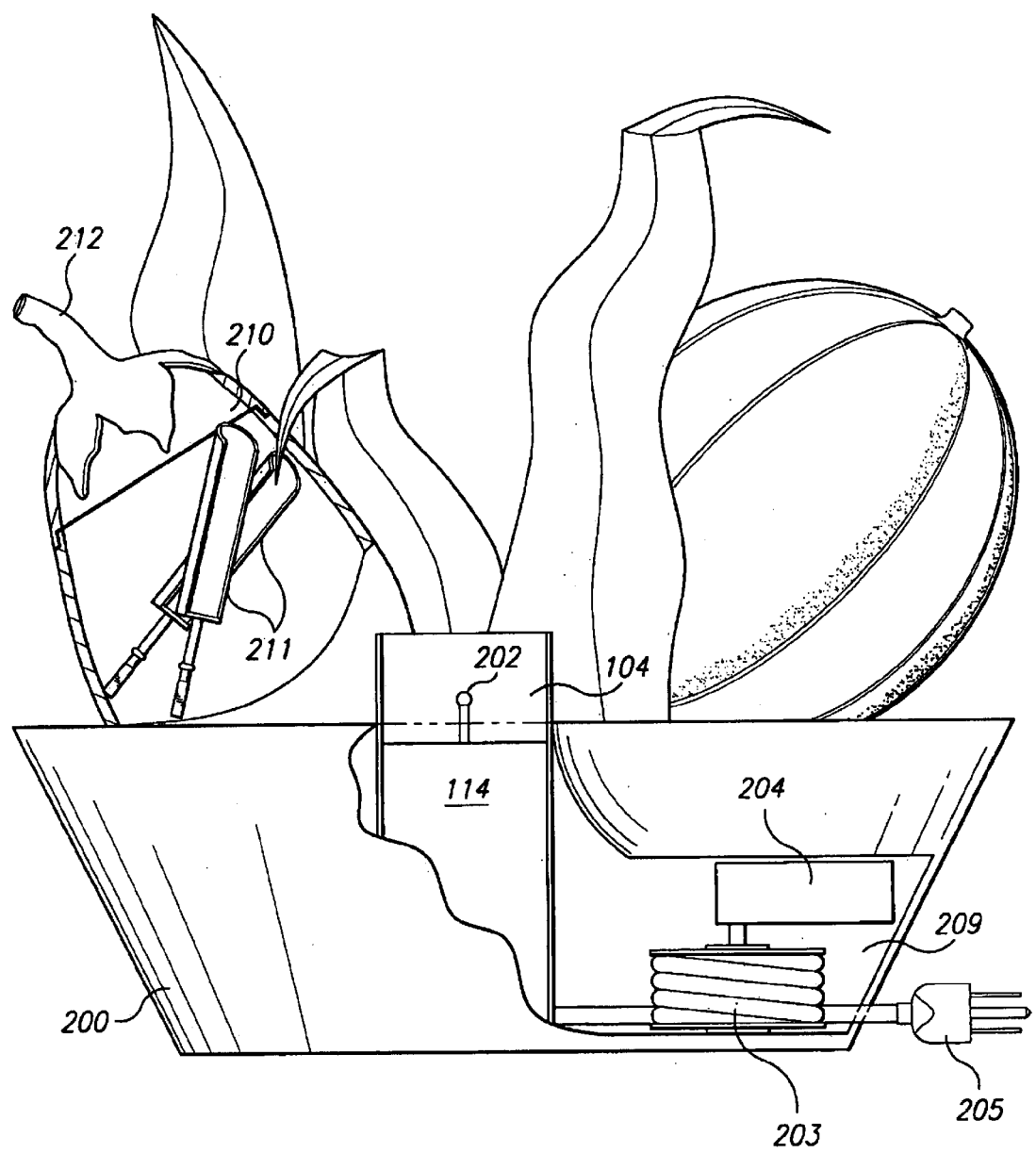
FIG. 2 is a schematic illustration of the stand of FIG. 1 with portions cutaway to show interior cavities of the stand.

As shown in FIG. 2, the stand 200 includes a compartment 209 operatively receiving a retractable reel 203 of electric cord having plug 205 fitting into a conventional A.C. wall outlet. The compartment also operatively receives a battery charger unit 114 for charging the battery 113 (seen in FIG. 3) of the tool 100. The cord supplies power to a battery charger.

The reel 203 includes a control mechanism 204 for releasing and retracting the cord upon the reel 203 and is disposed within the compartment 209.

The battery charger unit 114 has a charging prong 202 for engaging the charging input jack 115 on the bottom of the tool handle 103. The charging prong 202 protrudes outwardly from the base of a first open cavity 104 in the stand. The first open cavity 104 is sized and shaped to receive the tool handle 103 for storage. When the tool handle 103 is placed within cavity 104, the prong 202 of charger unit 114 is received within the input jack 115 of the handle 103 and recharging of the battery 113 takes place when plug 205 is connected to an A.C. outlet. The stand 200 also includes a second open cavity 210 for storing an assortment of coring utensils 211 or other attachments. The open end of the second cavity 210 is covered by a removable closure 212 preferably shaped in the form of a sliced portion of a vegetable, so as to blend inconspicuously with the decorative vegetables in the basket.

Figure 3:
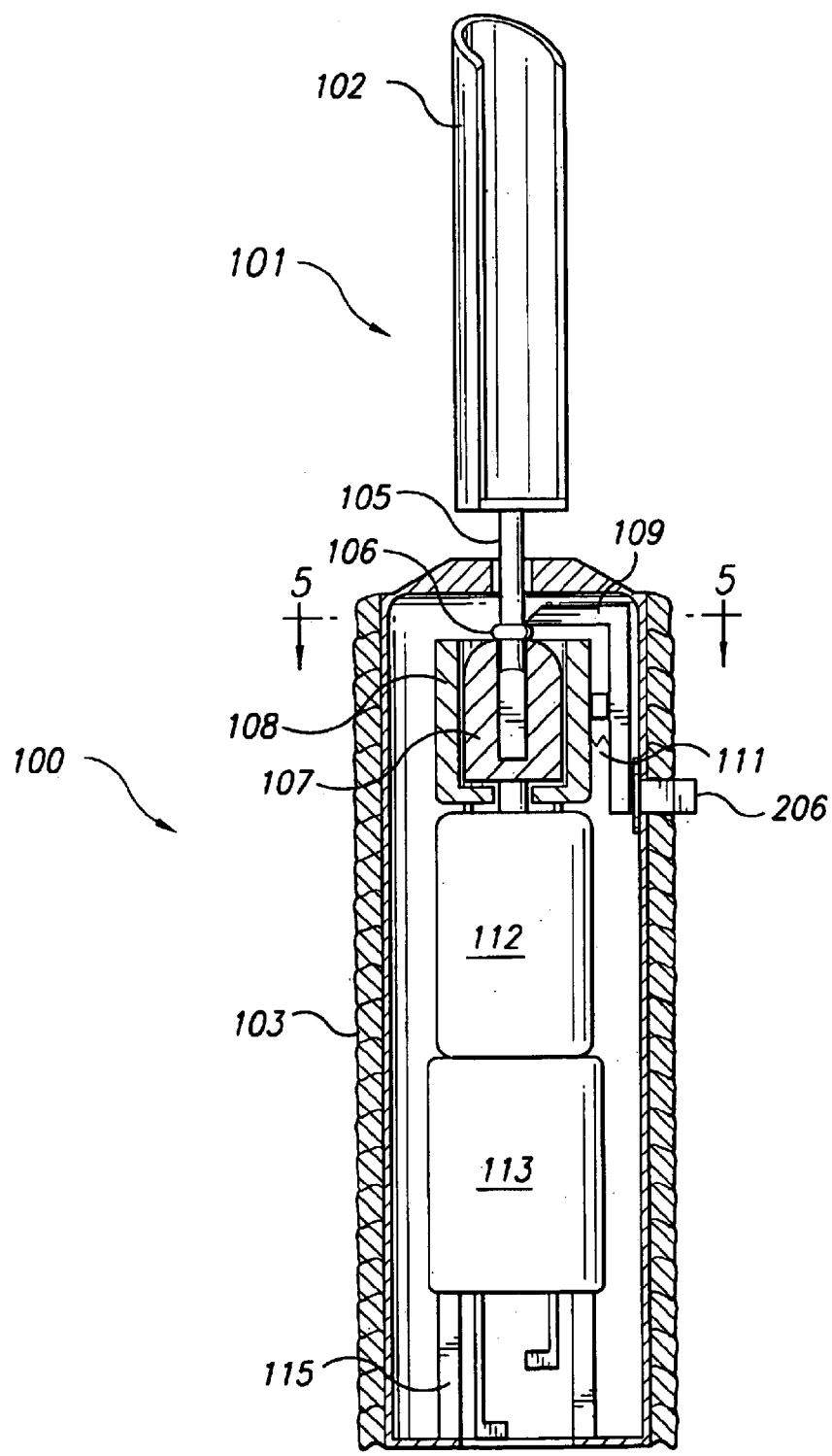
FIG. 3 is a cross-sectional view of the coring tool handle of FIG. 1, with a coring implement attached.

As seen in FIG. 3, a D.C. motor 112, the rechargeable battery 113 for supplying power to the motor, and the input jack 115 for receiving the charging prong 202 of the charger unit 114 are operatively mounted within the interior cavity of the handle 103. A switch 118 for controlling operation of the motor 112 is conveniently located on the side of the handle 103.

Figure 4:
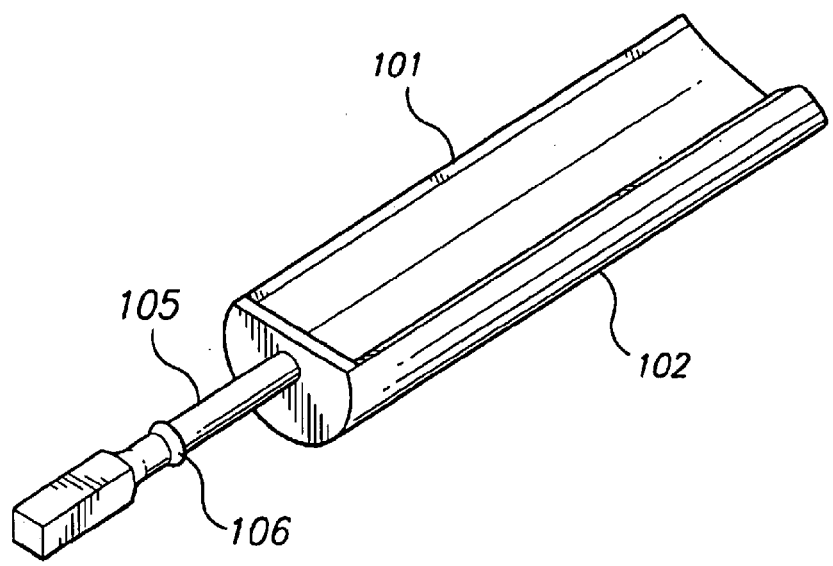
FIG. 4. is a perspective view of a coring implement, according to the present invention.

As can be seen in FIG. 4, each utensil is formed as an implement 101 with a blade 102 having beveled edges for cutting away the flesh of vegetable. The blade 102 can be in the form of an elongated trough that is semi-circular or semicylindrical in cross-section. One end of the trough is closed and one end of an attachment stem 105 is axially fixed thereto. An annular protrusion or locking ring 106 is formed on the second end of the attachment stem 105 of the blade. Additional utensils may be provided having blades which are scoop-like in construction, i.e. in the form of a spoon or bowl for forming balls of the flesh of vegetables and fruit.

The coring implement 101 and/or other variously sized and shaped attachments are secured at their attachment ends into an extension 107 of the motor shaft of a three speed D.C. motor 112 received within the interior cavity of the handle 103. Each implement 101 is formed with a blade 102 having beveled edges for cutting away the flesh of vegetables.

As previously stated, the blade 102 can be in the form of an elongated trough that is semi-circular in cross-section. One end of the trough is closed and an attachment stem 105 is axially fixed to the closed end of the trough. The second end of the stem 105 is shaped to for mating engagement with a stem socket formed in the motor shaft extension 107. An annular protrusion 106 encircles the stem 105 in an area adjacent to the second end of the stem. The protrusion 106 cooperates with an arm 109 of a locking mechanism fixedly mounted within the handle 103 to removably secure the implement 101 in the handle 103 for rotation with the motor shaft. Additional coring utensils 211 may be provided which differ in size.

Figure 5:
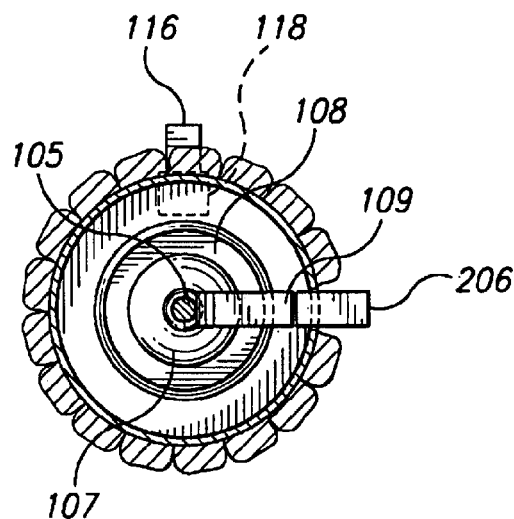
FIG. 5 is a top view of the coring tool handle of FIG. 3, according to the present invention.

As shown in FIGS. 3 and 5, the distal end of the arm 109 engages the stem 105 above the annular protrusion 106 to lock the coring implement 101 in the motor shaft extension 107. The arm 109 is pivotally mounted within the handle 103 on a stationary portion 108 the housing of motor 112. The second end of the arm 109 is spring biased on one side and engaged by a release button 206 passing through the outer wall of the handle 103 on an opposite side. The spring 111 biases the arm 109 into engagement with the stem 105 of implement 101. The button 206, when pressed, acts against the spring 111 to pivot the arm 109 out of engagement with the stem 105 to allow the implement 101 to be removed from the handle 103.

Release button and locking mechanism arrangements for rotary devices are known per se and are shown in schematic form in the drawings for the purpose of illustration only.

Figure 6:
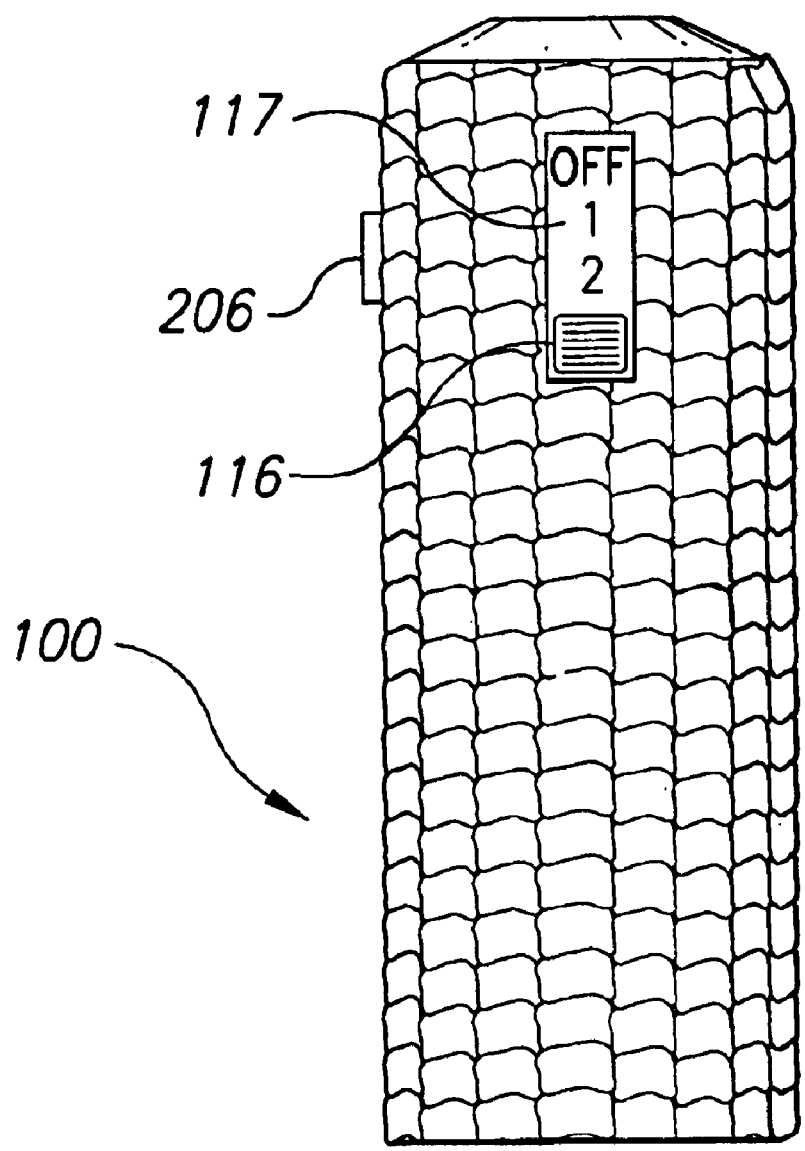
FIG. 6 is a side view of the coring tool handle of FIG. 3, according to the present invention.

As shown in FIG. 6, switch position indicia 117 and the sliding switch button 116 are provided within a recess in the outer face of the tool handle 103. Pushbutton or other type switches are also suitable for use on the tool handle for controlling the motor. The switch 118 may also be placed so as to be accessible through the bottom wall of the handle 103.

It is to be understood that the present invention is not limited to the embodiment described above, but encompasses any and all embodiments within the scope of the following claims.

We claim:

1. A variable-speed coring tool kit comprising:
    a coring tool having a decorative handle for grasping said coring tool when coring vegetables;
    a plurality of variously sized and shaped coring implements separately attachable to said coring tool; and
    a decorative stand for charging and removably storing said coring tool until needed for use;
    wherein said coring tool and said stand together form a decorative display.

2. The variable speed coring tool kit according to claim 1, wherein said decorative stand includes a housing having a compartment defined therein for inconspicuously storing the plurality of coring implements.

3. The variable speed coring tool kit according to claim 1, wherein the decorative display is in the form of a basket of vegetables and said handle is formed to appear as an ear of corn without an outer husk.

4. The variable speed coring tool kit according to claim 1, wherein:
    said coring tool is a portable rechargeable-battery-powered 3-speed coring tool; and
    said stand further includes an electric cord and means for releasing said electric cord out of said stand for connection to an A.C. outlet and retracting said electric cord back into said stand.

5. The variable speed coring tool kit according to claim 1, wherein said stand has a cavity defined therein, said stand further having a charging prong disposed in said cavity, said cavity being dimensioned and configured for storing and recharging said coring tool.

6. A coring tool kit comprising:
    a portable, rechargeable-battery-powered 3-speed coring tool having a decorative handle for grasping said coring tool when coring vegetables;
    a plurality of variously sized and shaped coring implements separately attachable to said coring tool; and
    a decorative stand for removably storing said coring tool until needed for use, said stand having:
        charging means for charging the battery of said coring tool, the charging means including an electric cord adapted for connection to an A.C. outlet; and
        cord releasing means for releasing the electric cord from said stand for connection to an A.C. outlet and retracting said electric cord back into said stand when said coring tool battery is charged;
    wherein said coring tool and said stand together form a decorative display.

7. The coring tool kit according to claim 6, further including a compartment formed in said stand for storing said coring implements, said compartment having a cover for closing said compartment.

8. The coring tool kit according to claim 6, wherein said stand has a cavity defined therein and further comprises a charging prong protruding from a bottom of said cavity into said cavity, said cavity removably receiving said coring tool handle for storage and charging of said battery.

9. The coring tool kit according to claim 8, wherein said stand includes a first compartment and a second compartment;
    said charging means and said cord releasing means are operatively mounted within said first compartment;
    said second compartment of said stand has a cover; and
    said coring implements are inconspicuously stored in said second compartment.

10. The coring tool kit according to claim 6, wherein said stand includes a first compartment and a second compartment;
    said charging means and said cord releasing means being mounted within said first compartment;
    said second compartment of said stand including a cover; and
    said coring implements being inconspicuously stored in said second compartment.

11. The coring tool kit according to claim 10, wherein said handle of the coring tool has a hollow cavity defined therein, the coring tool further including:
    an input jack mounted in a bottom wall of said cavity for receiving a charging prong, said input jack being connected to said battery;
    a 3-speed motor connected to said battery; and
    a rotating element driven by said motor;
    said input jack, said battery, said motor and said rotating element being operatively mounted within said hollow cavity of said coring tool handle.

12. The coring tool kit according to claim 11, wherein said coring tool further comprises a switch mounted on said coring tool handle for controlling said motor.

13. The coring tool kit according to claim 12, wherein each said implement has a stem with an end shaped for mating engagement with an aperture in said rotating element and an annular protrusion adjacent said end, said coring tool further comprising:
    means for automatically engaging said stem and said protrusion for locking said implement into said rotating element; and
    a release button passing through a hole in the side of said coring tool handle, said button engaging said engaging means when pressed inward to release the end of said implement from said rotating element so that said implement can be removed from said coring tool handle.

14. The coring tool kit according to claim 13, wherein said stem is passed through an opening in the top of said coring tool handle.

15. The coring tool kit according to claim 13, wherein said engaging means includes a pivotally mounted L-shaped arm and a spring for biasing said arm into locking engagement with said stem.

16. The coring tool kit according to claim 6, wherein said coring tool further comprises a switch mounted on said coring tool handle for controlling said motor.

17. The coring tool kit according to claim 16, wherein each said implement has a stem with an end shaped for mating engagement with an aperture in said rotating element and an annular protrusion adjacent said end, said coring tool further comprising:
    means for automatically engaging said stem and said protrusion for locking said implement into said rotating element; and
    a release button passing through a hole in the side of said coring tool handle, said button engaging said engaging means when pressed inward to release the end of said implement from said rotating element so that said implement can be removed from said coring tool handle.

18. The coring tool kit according to claim 17, wherein said stem is passed through an opening in the top of said coring tool handle.

19. The coring tool kit according to claim 17, wherein said engaging means includes a pivotally mounted L-shaped arm and a spring for biasing said arm into locking engagement with said stem.

20. A coring tool kit comprising:
- a portable, rechargeable-battery-powered 3-speed coring tool having a decorative handle for grasping said coring tool when coring vegetables;
- a plurality of variously sized and shaped coring implements separately attachable to said coring tool; and
- a decorative stand for removably storing said coring tool until needed for use, said stand having:
    - charging means for charging the battery of said coring tool, the charging means including an electric cord adapted for connection to an A.C. outlet,
    - cord releasing means for releasing the electric cord from said stand for connection to an A.C. outlet and retracting said electric cord back into said stand when said coring tool battery is charged, a first compartment, and a second compartment, wherein said coring tool handle and said tool stand together form a decorative display;
- said charging means and said cord releasing means being mounted within said first compartment;
- said second compartment of said stand including a cover and said coring implements are inconspicuously stored in said second compartment;
- wherein said handle of the coring tool has a hollow cavity defined therein, the coring tool further including:
    - an input jack mounted in a bottom wall of said cavity for receiving a charging prong, said input jack being connected to said battery;
    - a 3-speed motor connected to said battery; and
    - a rotating element driven by said motor;
- said input jack, said battery, said motor and said rotating element being operatively mounted within said hollow cavity of said coring tool handle;
- a switch mounted on said coring tool handle for controlling said motor;
- wherein each said implement has a stem with an end shaped for mating engagement with an aperture in said rotating element and an annular protrusion adjacent said end;
- said coring tool further comprising:
    - means for automatically engaging said stem and said protrusion for locking said implement into said rotating element; and
    - a release button passing through a hole in the side of said coring tool handle, said button engaging said engaging means when pressed inward to release the end of said implement from said rotating element so that said implement can be removed from said coring tool handle;
- said stem is passed through an opening in the top of said coring tool handle; and
- said engaging means includes a pivotally mounted L-shaped arm and a spring for biasing said arm into locking engagement with said stem.

* * * * *